United States Patent [19]

Takahashi et al.

[11] 4,027,463

[45] June 7, 1977

[54] LAWN MOWER

[75] Inventors: Katsuhiko Takahashi, Tokorozawa; Hachiro Doi, Kamifukuoka, both of Japan

[73] Assignee: Fuso Keigokin Co., Ltd., Tokyo, Japan

[22] Filed: Sept. 4, 1975

[21] Appl. No.: 610,222

[30] Foreign Application Priority Data

May 30, 1975 Japan .............................. 50-65963

[52] U.S. Cl. .............................. 56/13.6; 56/17.5; 56/295
[51] Int. Cl.² .............................. A01D 55/26
[58] Field of Search ............ 56/255, 295, 16.7, 17.5

[56] References Cited

UNITED STATES PATENTS

| 2,529,797 | 11/1950 | Cauble | 56/295 |
| 2,529,870 | 11/1950 | Golasky | 56/17.2 |
| 3,152,431 | 10/1964 | Ott et al. | 56/13.6 |
| 3,500,622 | 3/1970 | Bowen | 56/295 |
| 3,835,630 | 9/1974 | von der Au | 56/295 |

Primary Examiner—Russell R. Kinsey
Attorney, Agent, or Firm—Oblon, Fisher, Spivak, McClelland & Maier

[57] ABSTRACT

Disclosed is a lawn mower having several pairs of rotatable blades attached to a rotatable frame. The rotatable frame is motor driven, and centrifugal forces cause a frictional engagement between blade driving means and a portion of the frame so that each pair of the blades assume a planetary rotary motion, yet are capable of movement away from obstacles.

6 Claims, 2 Drawing Figures

LAWN MOWER

BACKGROUND OF THE INVENTION

1. Field of the Invention

This invention relates generally to lawn mowers, and more particularly to a lawn mower having several pairs of rotatable blades driven by friction means to assume a planetary rotary motion.

2. Description of the Prior Art

Conventional lawn mowers may be classified according to mechanism, such as the reel type, the rotary type, the hair-clipper type, and the like. They are generally characterized by a positive, direct drive and thus obstacles such as stones and the like will damage the blades when struck. Further, many lawn mowers such as the reel type require maintenance of relatively fine tolerances by constant adjustment to ensure good cutting action.

SUMMARY OF THE INVENTION

Accordingly, one object of this invention is to provide a motor driven lawn mower with a simple mechanism.

Another object of this invention is to provide a motor driven lawn mower having a centrifugally engaged frictional drive means to rotate the grass cutting blades.

A still further object of this invention is to provide a motor driven lawn mower with several pairs of cutting blades that assume a planetary rotary motion.

Yet another object of this invention is to provide a motor driven lawn mower with blades capable of movement away from obstacles.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF A PREFERRED EMBODIMENT

Figure 1:
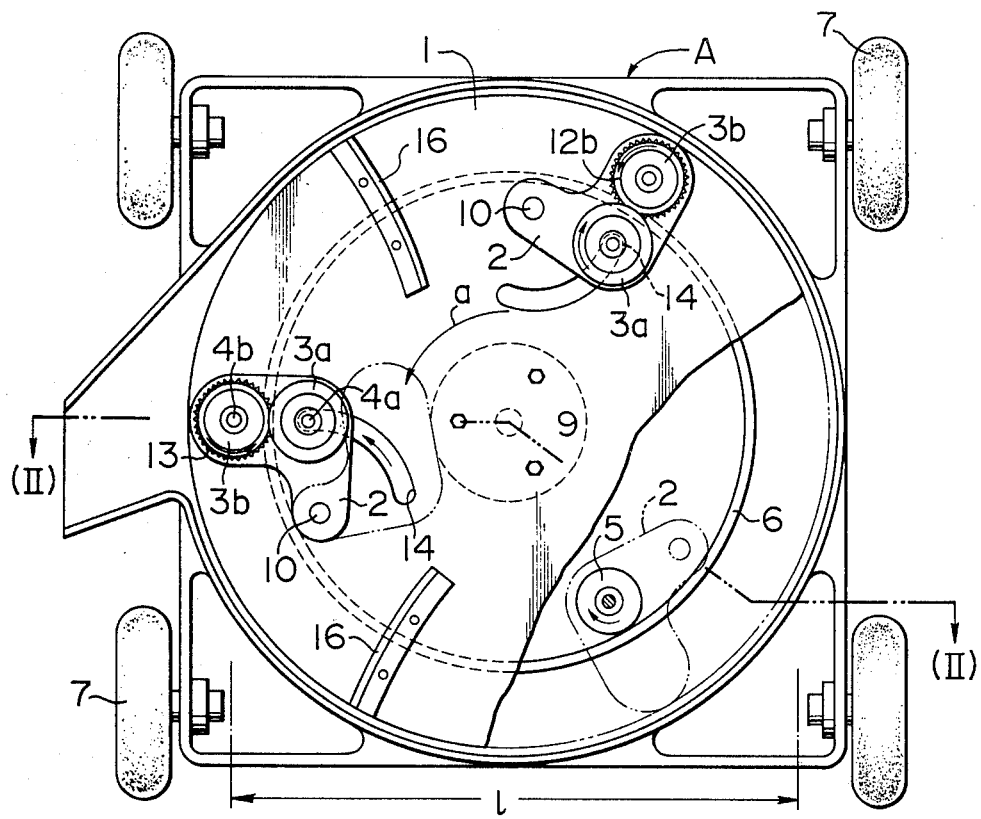
FIG. 1 is a bottom view of the lawn mower with a partial section cut away to reveal the frictional drive means.
Figure 2:
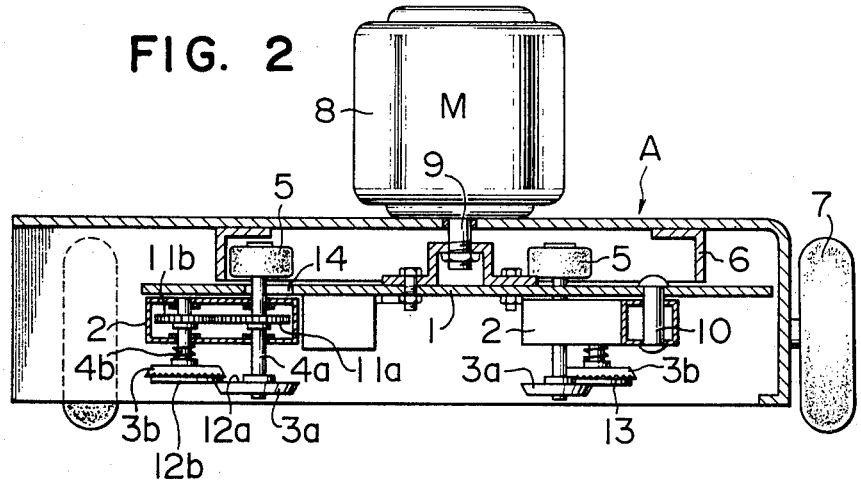
FIG. 2 is a cross-sectional view taken along the line II—II in FIG. 1.

The lawn mower has a frame A of conventional design that when viewed in cross section has an inverted U-shape. Wheels 7 are attached to the frame at its four corners so that the mower may be rolled across the lawn. A motor M is mounted on the top of frame A and may be a conventional gasoline or electrical motor enclosed within protective housing 8. Extending down through bearings in frame A is motor shaft 9 and attached thereto is rotary disc 1. A stationary frictional ring 6 is attached to the inner side of the top portion of frame A and is formed from steel or some other material with high wear resistance.

A plurality of gear enclosure and blade mounts 2 are mounted on and carried by rotary disc 1 and for example, the number such gear enclosures and blade mounts may be three spaced 120° apart. Each gear enclosure and blade mount 2 is pivotally mounted to rotary disc 1 by means of pivot pin 10. Each gear enclosure and blade mount 2 is a generally L-shaped enclosure carrying within its interior a driving gear 11a and a driven gear 11b mounted on shafts 4a and 4b respectively. Shaft 4a is of a length to extend beyond both sides of gear enclosure and blade mount 2 and carries on its upper end a frictional roller 5 and on its lower end a lower cutting blade 3a. Appropriate bearings in gear enclosure and blade mount 2 support both shafts for rotation. Shaft 4b is of a length sufficient to extend below gear enclosure and blade mount 2 and carries on its extremity an upper cutting blade 3b.

An arcuate slot 14 is formed through rotary disc 1 at each location of a gear enclosure and blade mount 2, and the radius of the arc is equivalent to the distance between pivot pin 10 and shaft 4a so that gear enclosure and blade mount 2 may move in an arcuate path defined by arcuate slot 14 under the influence of centrifugal force when motor M drives rotary disc 1.

Friction ring 6 is of a size and location so that each of the frictional rollers 5 come into contact with the interior surface of friction ring 6 when they are outwardly biased by centrifugal force, thereby rotating as they move in contact with frictional ring 6. Because frictional roller 5 is fixedly mounted to shaft 4a, that shaft also rotates, in turn rotating driving gear 11a. Driven gear 11b being in mesh therewith is also rotated as frictional roller 5 rotates. In like manner, lower cutting blade 3a and upper cutting blade 3b are rotated relative to each other and by virtue of their mating cutting surfaces 12a and 12b, the grass coming into contact with the blades will be severed. It is noted that upper cutting blade 3b has serrated teeth 13 formed thereon to further facilitate cutting grass.

Vanes 16 are rigidly attached to the under surface of rotary disc 11 and assist in directing severed grass out of the chute or nozzle of the frame visible to the left side of FIG. 1.

A particular advantage with the structure of the present invention is the ability of the gear enclosure and blade mounts to move away from obstacles such as stones when they come into contact therewith. Rotation of rotary disc 1 is in the direction shown by arrow $a$ in FIG. 1 and thus the leading edge of gear enclosure and blade mount 2 in the region of blade 3b would be the portion of the gear enclosure and blade mount means that would strike the obstacle. The force of contact would bias the entire enclosure in a clockwise fashion around pivot point 10 thereby allowing the blade assembly to move away from the obstacle.

It is noted that gears 11a and 11b are completely enclosed within gear enclosure and blade mount 2 and thus are not fouled or jammed by grass cuttings and other debris.

It is considered desirable to have frictional roller 5 formed of hard rubber or synthetic resin to increase frictional engagement between roller 5 and frictional ring 6. Further, frictional roller 5 should approximate the diameter or be somewhat smaller than that of the rotary blades 3a and 3b to facilitate a high speed rotation of the blades.

In a lawn mower of the type pictured in FIG. 1, the lawn mower insures an efficient cutting of grass in an area with a width designated 1. Since centrifugal force is utilized for the rotary movement of the blades, the mechanism is highly simplified and thus maintenance and inspection are also simplified. Due to the balanced placements of the gear enclosure and blade mount assemblies the rotational movement of both rotary disc 1 and the individual blades relative to each other is highly stable.

Obviously, numerous modifications and variations of the present invention are possible in light of the above teaching. It is therefore to be understood that within the scope of the appended claims the invention may be practiced otherwise than as specifically described herein.

We claim:

1. A lawn mower comprising:
   a frame with means to support said frame on the ground,
   a motor driven rotary disc supported by and disposed within said frame,
   a pair of coacting blades carried by said rotary disc,
   frictional means for driving said blades under the influence of centrifugal force, comprising a stationary ring carried by said frame, and a frictional roller mounted upon said disc and being capable of pivotal movement relative to said disc so that when said disc rotates, said frictional roller pivots into contact with said ring under the influence of centrifugal force; and
   means operatively connected to said frictional roller for positively rotating both of said blades relative to each other.

2. The lawn mower of claim 1 wherein said positively rotating means comprises:
   a pair of shafts with each mounting one of said blades at one end,
   said frictional roller being rigidly mounted on the other end of one of said shafts, and
   each shaft carries a gear in meshed engagement with that on the other shaft,
   whereby rotation of said frictional roller rotates said gear and blade carried by its shaft, and said gear and blade carried by the other shaft is rotated by means of said meshed engagement of said gears.

3. The lawn mower of claim 2 including a gear enclosure and blade mount means that is pivotally mounted on said disc and suppots said pair of shafts.

4. The lawn mower of claim 3 wherein said disc has formed therethrough an arcuate slot, and said shaft carrying said frictional roller passes therethrough whereby said frictional roller is above said disc and said gears and blades are below said disc.

5. The lawn mower of claim 4 wherein there is a plurality of said gear enclosure and blade mount means equally spaced on said disc.

6. The lawn mower of claim 1 wherein there are a plurality of said pair of coacting blades symmetrically spaced about the perimeter of said rotary disc.

* * * * *